(12) United States Patent
Porco

(10) Patent No.: US 6,921,141 B1
(45) Date of Patent: Jul. 26, 2005

(54) WATER RESISTANT INSTRUMENT ENCLOSURE

(75) Inventor: Carmen R. Porco, San Luis Obispo, CA (US)

(73) Assignee: CRP Enterprises, San Luis Obispo, CA (US)

( * ) Notice: Subject to any disclaimer, the term of this patent is extended or adjusted under 35 U.S.C. 154(b) by 289 days.

(21) Appl. No.: 10/170,531

(22) Filed: Jun. 13, 2002

(51) Int. Cl.[7] .................................................. H02B 1/01
(52) U.S. Cl. ..................... 312/100; 312/242; 312/319.2
(58) Field of Search ............................... 312/242, 296, 312/319.2, 327, 328, 100, 139.1, 323, 9.1; 49/386, 387; 10/DIG. 7; 296/37.12, 37.8

(56) References Cited

U.S. PATENT DOCUMENTS

| | | | | |
|---|---|---|---|---|
| 2,202,277 A | * | 5/1940 | Visser | 180/90 |
| 3,763,332 A | * | 10/1973 | Race | 369/10 |
| 3,803,368 A | * | 4/1974 | Artner et al. | 369/80 |
| 4,239,277 A | * | 12/1980 | Oda | 296/37.12 |
| 4,517,901 A | * | 5/1985 | Clark | 109/19 |
| 4,552,399 A | * | 11/1985 | Atarashi | 296/37.12 |
| 4,596,416 A | * | 6/1986 | Muller | 296/37.12 |
| 4,828,236 A | * | 5/1989 | Inoue | 267/182 |
| 4,856,854 A | * | 8/1989 | Nishiyama et al. | 312/34.11 |
| 5,094,516 A | * | 3/1992 | Hunter | 312/319.1 |
| 5,184,489 A | * | 2/1993 | Squires et al. | 70/58 |
| 5,232,277 A | * | 8/1993 | Cassady et al. | 312/296 |
| 5,726,868 A | * | 3/1998 | Koyama et al. | 361/832 |
| 5,810,168 A | * | 9/1998 | Eggering | 206/372 |
| 6,213,533 B1 | * | 4/2001 | Widulle et al. | 296/37.12 |
| 6,296,337 B1 | * | 10/2001 | Kawanabe | 312/319.2 |
| 6,601,897 B2 | * | 8/2003 | Stelandre et al. | 296/37.12 |

* cited by examiner

*Primary Examiner*—Janet M. Wilkens
(74) *Attorney, Agent, or Firm*—Marvin H. Kleinberg; Marshall A. Lerner; Kleinberg & Lerner, LLP

(57) ABSTRACT

A water resistant enclosure is provided for devices such as radios which are installed in, for example, marine vehicles where there is constant exposure to moisture, spray, and the like. An enclosure mounts to the vehicle and supports the device. A bezel frame seals the enclosure to a surface of the vehicle and a rotatable window protects the device faceplate and operating controls. The window is manually rotated and latched into a closed configuration. Seals on the bezel frame bear against a front surface of the window and seals on the rear surface of the window bear against an interior surface of the bezel frame. When manually unlatched, the window rotates to its open configuration.

15 Claims, 4 Drawing Sheets

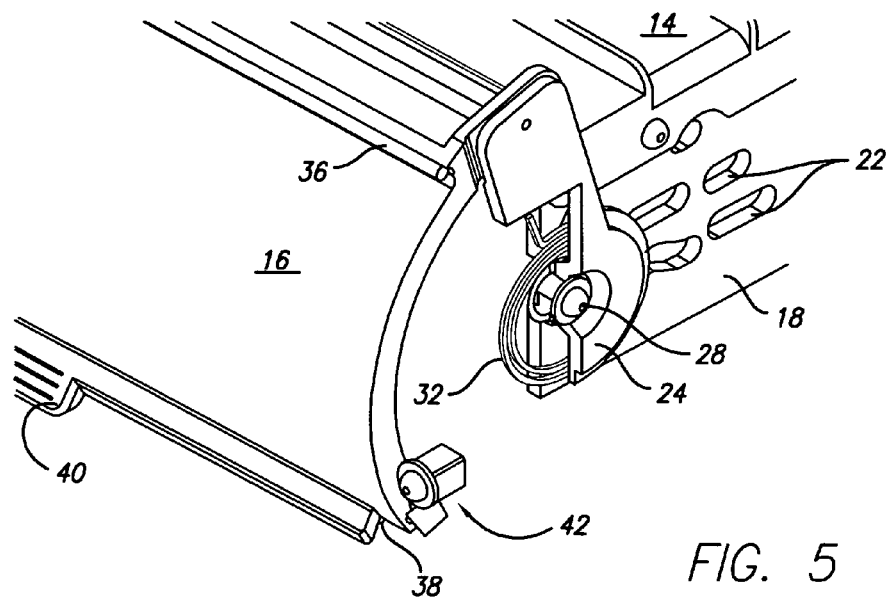
FIG. 5
FIG. 6
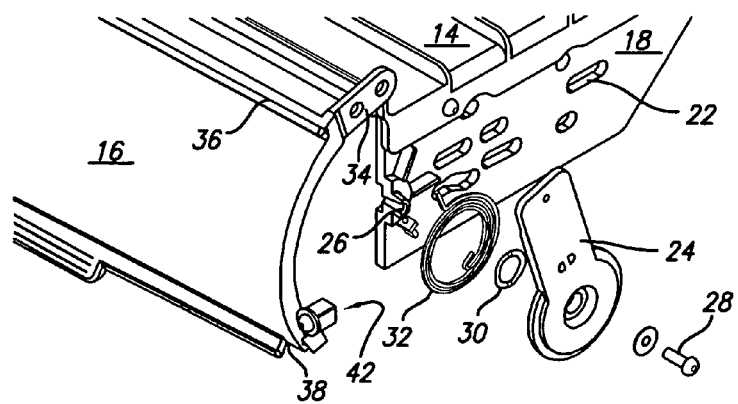

WATER RESISTANT INSTRUMENT ENCLOSURE

BACKGROUND OF THE INVENTION

1. Field of the Invention

The present invention relates to instrument enclosures and, more particularly, a weather resistant housing suitable for an outdoor environment.

2. Description of the Related Art

Marine radios and other instruments are often exposed to the elements. The effects of exposure to salt and fresh-water spray, mists, rain and fog can result in corrosion, deterioration and a build up of salt which can adversely affect electronic components and ultimately compromise any electronic equipment so exposed.

Enclosures have been available in the prior art to provide protection to audio electronic devices such as radios, tape and CD players which must be protected from the environment encountered on boats or other watercraft. The simplest provides an enclosure with a movable window that includes pins that ride in a groove as the window is manually rotated to a retracted position. This device lacks seals and requires care to keep the pins in their grooves.

Other unit includes a latch to hold the window closed which, when released, permits the window to rotate open under the influence of springs adjacent the pivots. A central tab is used to manually close the window and engage the latch.

Yet another device provides a bi-stable spring mounting so that when the window is manually rotated more than half-way, the springs take over and complete the action. Such a device therefore requires manual operation on both opening and closing.

SUMMARY OF THE INVENTION

According to the present invention, a self opening door mechanism is equipped with water resistant seals to protect an electronic instrument such as a marine radio. The door, when opened, permits access to the various controls. When closed, the door blocks ambient moisture from the interior of the instrument.

To open the door, manual operation raises the door to disengage a detent spring after which a spiral spring mechanism completes the opening operation. The door must be closed manually, at least to engage the detent spring which biases the door shut, maintaining a force against the perimeter seals. When closed, the door provides a weather resistant seal against ambient conditions. A water resistant shield can be supplied to prevent leaks and drips from the area above the instrument from entering the circuit areas.

A foam gasket is provided between the enclosure and the dashboard to prevent moisture from entering around the mounting opening. Moreover, drainage holes are provided in the frame portion to allow any moisture that does accumulate to escape.

Accordingly, it is an object of the present invention to provide a water resistant enclosure for marine instruments. It is another object of invention to provide a water resistant enclosure for a marine radio. It is yet another object of invention to provide a water resistant enclosure with a protective door that can be secured in a sealed configuration. Yet another object of invention is to provide a water resistant enclosure with a door that can when manually released, open without further intervention.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 5 is a perspective view of the operating mechanism of the embodiment of FIG. 1, partially cut away to show details;

FIG. 6 is an exploded perspective view of the mechanism of FIG. 5 with some elements partially cut away to show details;

DESCRIPTION OF THE PREFERRED EMBODIMENTS

Figure 1:
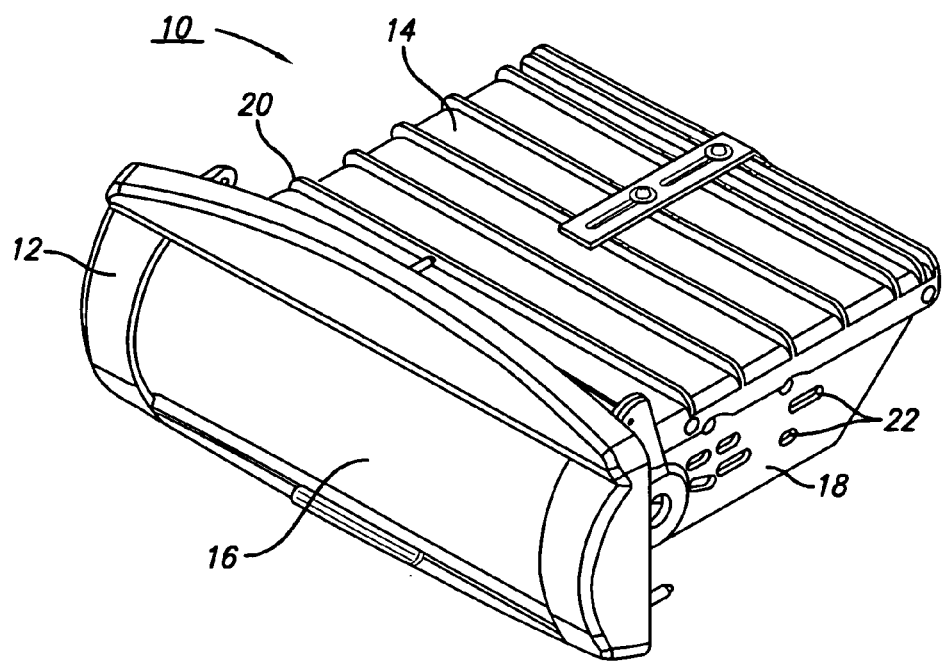
FIG. 1 is a perspective of an embodiment of a water resistant instrument enclosure according to the present invention.

Turning first to FIG. 1, there is shown an enclosure 10 for an instrument, in this embodiment a marine radio device. The enclosure 10 includes a front bezel element 12 which mounts to a dashboard (not shown) or to a front wall of a vessel into which the radio is installed.

Figure 2:
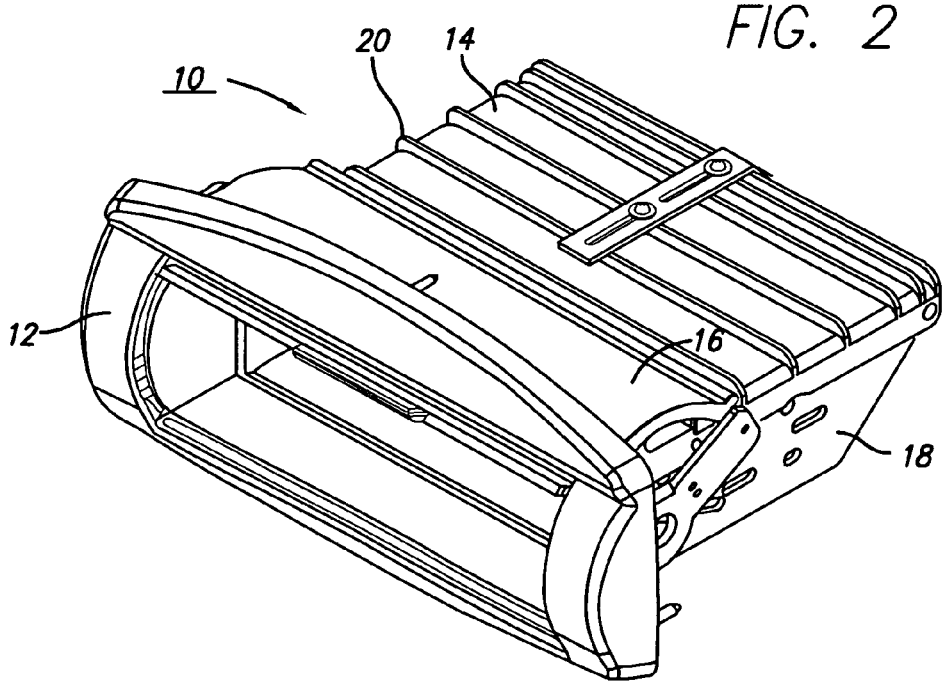
FIG. 2 is a perspective view of the instrument enclosure of FIG. 1, with an access window in the open configuration.

A water resistant top cover 14 protects the instrument from water which may enter from the marine structures over-lying the installed enclosure 10. A window element 16 can be opened to permit access to the radio controls (not shown). FIG. 2 shows the enclosure 10 with the window element 16 in the open configuration. Side walls 18, 20 include apertures 22 through which mounting fasteners can penetrate to attach the radio apparatus to the enclosure 10.

Figure 3:
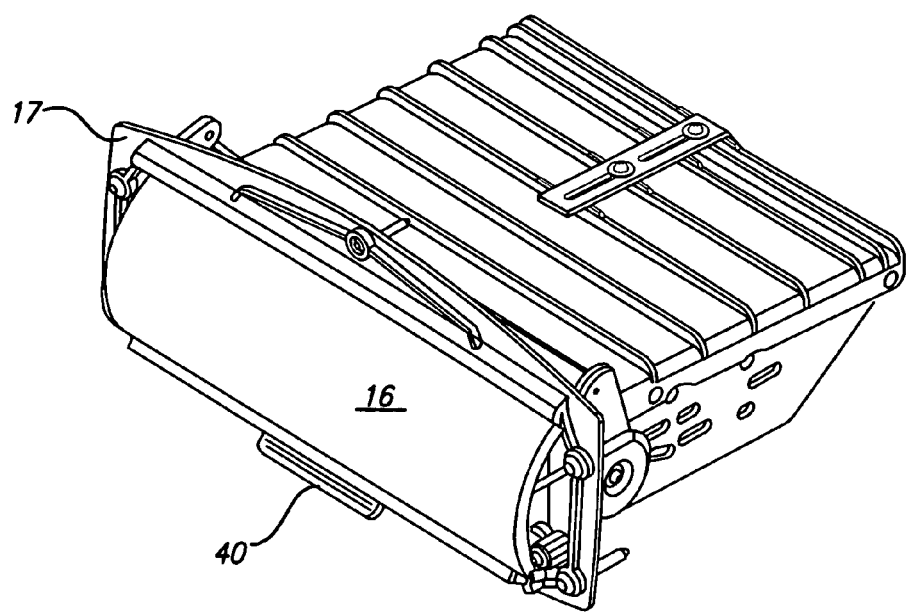
FIG. 3 is a perspective view of the enclosure of FIG. 1 with the bezel removed.
Figure 4:
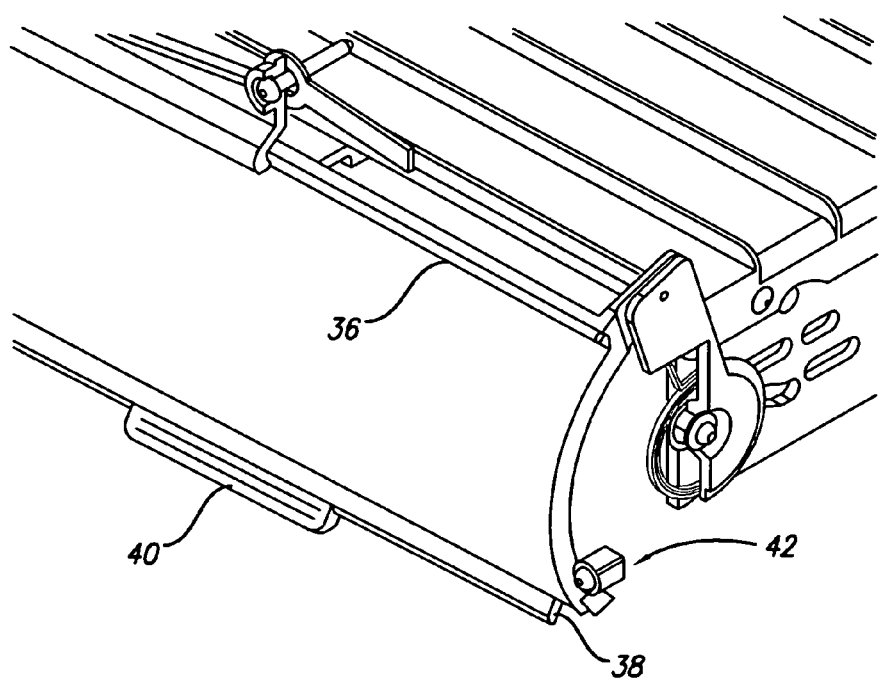
FIG. 4 is a perspective view of the enclosure of FIG. 3, with the front of the frame removed to show details of the window.

FIGS. 3 and 4 show the details of the enclosure 10 with the bezel 12 removed. FIG. 3 shows the window 16 in the closed and latched position. A bezel frame 17 spans the front opening of the enclosure 10 and is attached to the side walls 18, 20. FIG. 4 shows the window 16 in a partially open configuration As can be seen, an upper seal member 36 rides upon the window 16 to exclude moisture. A lower seal member 38 is affixed to the lower edge of the window 16. A lip or handle 40 enables manual operation of the window 16.

Turning next to FIGS. 5 and 6, the details of the window 16 and its mounting to the side wall 18 are shown. As noted above, FIG. 6 is an exploded view of the elements of FIG. 5. The window support mechanism includes a window arm 24 (shown partially cut away in FIG. 5 but complete in FIG. 6) which is mounted on cylindrical boss 26 by a fastener element 28, shown here as a screw. A wave washer 30 is placed between the window arm 24 and the side wall 18 to provide consistent friction dampening. Alternatively, viscous damping can be achieved by te use of a damping grease in place of the wave washer 30.

A spiral spring 32 biases the window 16 into the open configuration and holds it open. A corresponding window support mechanism is supplied on the opposite side wall 20. The window arm 24 fastens to the window 16 at an upper-end which has an attachment flange 34. The upper gasket seal 36 is placed on the outer surface of the window 16 across the top so that it is compressed between a lip on the inner surface of the bezel 12 and the window 16. A lower gasket seal 38 is placed on the inner surface of the window 16 and is compressed between the window 16 and the outer surface of the front face of the enclosure 10.

Figure 7:
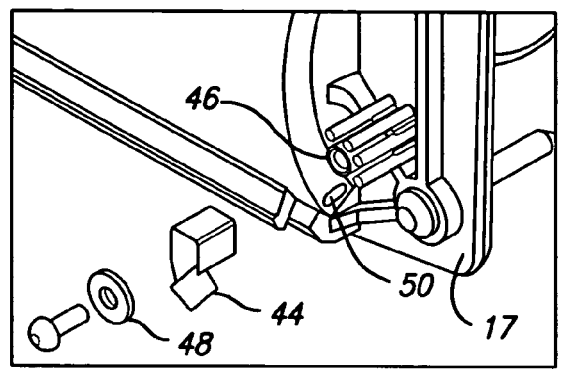
FIG. 7 is an exploded perspective view of the restraining spring and associated stop member.
Figure 8:
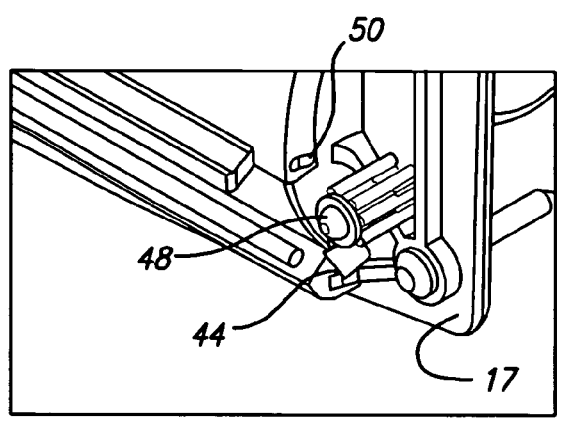
FIG. 8 is a front view of the restraining mechanism of FIG. 7 in the opened configuration.

The window 16 then rotates about the cylindrical boss 26 and, when otherwise unrestrained will rotate into the open configuration under the force of the spiral spring 32. To close the window 16, a handle 40 is provided at the base of the window 16 which allows for manual rotation of the window against the force of the spring 32. A window latching mechanism 42, best seen in FIGS. 7–9, is mounted on the bezel frame 17 and holds the window 16 in the closed configuration and exerts a bias force which helps compress the lower seal 38.

The latching mechanism 42 includes a shaped snap spring 44 which is mounted to a boss 46 on the bezel frame 17 by a screw and washer combination 48. A lug 50 extends from the window 16 and can cam the snap spring 44 inward when the window 16 is opened or closed. As soon as the lug 50 clears the leaf spring 44 upon opening, the window 16 can be released and it will continue to open under the force of the spiral springs 32. This can be seen in FIG. 8.

Figure 9:
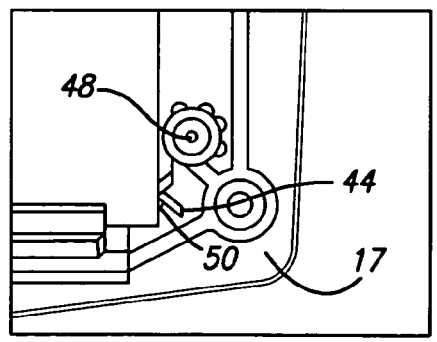
FIG. 9 is perspective view of the mechanism of FIG. 7 in the closed configuration.

When the window 16 is closed, the lug 50 cams the leaf spring 44 outward and the force of the leaf spring 44 when bearing against the lug 50 is sufficient to prevent the window from opening under the force of the spiral spring 32 or the usual shock and vibratory forces experienced in the environment of a marine vehicle The closure relationship is shown in FIG. 9.

Under operating conditions, even foul weather with rough seas will not cause the leaf springs 44 to release the window, thereby maintaining the water resistant seal during periods of exposure to wind and wave action. The apparatus of the present invention is intended to withstand rain and spray and wave action, as well as storm driven moisture.

Thus there has been shown and described a water resistant cover for an instrument which is exposed to the environment. However, the scope of the invention should be limited only by the claims appended hereto.

What is claimed as new is:

1. For use with a device having a front panel with controls thereon adapted to be installed on a substantially vertical surface, a water resistant enclosure for the front panel of such device comprising:
   a. a pair of side walls adapted to connect to the device and to the surface;
   b. a bezel frame attached to said side walls and adapted to attach to the surface;
   c. a window having interior and exterior surfaces, said window being rotatably mounted on said side walls and fitted within said bezel frame, said window being adapted to isolate the front panel from exterior moisture; and
   d. sealing gasket means attached to said exterior surface of said window and adapted to sealingly engage said bezel frame when in a closed configuration;
   whereby the front panel is protected from ambient moisture when said window is in the closed configuration.

2. The enclosure of claim 1, further including biasing means coupled between said side walls and said window for biasing said window in an open configuration within said bezel frame whereby said window is held open affording access to operate the front panel controls of the device.

3. The enclosure of claim 2 wherein said biasing means include a first spiral spring attached to one of the side walls of said pair of side walls.

4. The enclosure of claim 3 wherein said biasing means further include a second spiral spring attached to the other of the side walls of said pair of side walls.

5. The enclosure of claim 1, further including a moisture resistant cover attached to and spanning said side walls and said bezel frame to divert moisture from the device contained within the enclosure.

6. For use with a device having a front panel with controls thereon adapted to be installed on a substantially vertical surface, a water resistant enclosure for the front panel of such device comprising:
   a. a pair of side walls adapted to connect to the device and to the surface;
   b. a bezel frame attached to said side walls and adapted to attach to the surface;
   c. a window rotatable mounted on said side walls and fitted within said bezel frame, said window being adapted to isolate the front panel from exterior moisture;
   d. sealing gasket means attached to said window and adapted to sealingly engage said bezel frame when in a closed configuration;
   e. biasing means coupled between said side walls and said window for biasing said window in an open configuration within said bezel frame; and
   f. latching means adapted to hold said window in the closed configuration within said bezel frame against the bias of said biasing means and said sealing gasket means, thereby maintaining a water resistant barrier between the device and the environment of the devices;
   whereby said window is held open affording access to operate the front panel controls of the device and whereby the front panel is protected from ambient moisture when said window is in the closed configuration.

7. For use with a device having a front panel with controls thereon adapted to be installed on a substantially vertical surface, a water resistant enclosure for the front panel of such device comprising:
   a. a pair of side walls adapted to connect to the device and to the surface;
   b. a bezel frame attached to said side walls and adapted to attach to the surface;
   c. a window rotatable mounted on said side walls and fitted within said bezel frame, said window being adapted to isolate the front panel from exterior moisture;
   d. sealing casket means attached to said window and adapted to sealingly engage said bezel frame when in a closed configuration;
   e. biasing means coupled between said side walls and said window for biasing said window in an open configuration within said bezel frame; and
   f. latching means adapted to hold said window in the closed configuration within said bezel frame against the bias of said biasing means and said sealing casket means, thereby maintaining a water resistant barrier between the device and the environment of the device;
said latching means including:
- a first spring member attached to said bezel frame; and
- a protrusion on said window positioned to be engaged by said first spring member when in the closed configuration;

whereby said window is held open affording access to operate the front panel controls of the device and whereby the front panel is protected from ambient moisture when said window is in the closed configuration.

8. The enclosure of claim 7 wherein said latching means further include:
- a second spring member attached to said bezel frame on the opposite side thereof; and
- a second protrusion on said window positioned to be engaged by said second spring member when in the closed configuration.

9. The enclosure of claim 7 wherein said window further includes a handle element to allow manual engagement and disengagement of said latching means,
whereby said window, when manually disengaged from said latching means, is biased to the open configuration and, when said window is manually engaged with said latching means, is held in the closed, substantially water resistant configuration.

10. For use with a device having a front panel with controls thereon adapted to be installed on a substantially vertical surface, a water resistant enclosure for the front panel of such device comprising:
 a. a pair of side walls adapted to connect to the device and to the surface;
 b. a bezel frame attached to said side walls and adapted to attach to the surface;
 c. a window having interior and exterior surfaces, said window being rotatably mounted on said side walls and fitted within said bezel frame, said window being adapted to isolate the front panel from exterior moisture; and
 d. sealing gasket means attached between said window exterior surface and said bezel frame and adapted to provide a water resistant seal between said window and said bezel frame when said window is in a closed configuration;
whereby the front panel is protected from ambient moisture when said window is in the closed configuration.

11. The enclosure of claim 10, further including biasing means coupled between said side walls and said window for biasing said window in an open configuration within said bezel frame whereby said window is held open affording access to operate the front panel controls of the device.

12. The enclosure of claim 11 wherein said biasing means include a first spiral spring attached to one of the side walls of said pair of side walls.

13. The enclosure of claim 12 wherein said biasing means further include a second spiral spring attached to the other of the side walls of said pair of side walls.

14. The enclosure of claim 10, further including a moisture resistant cover attached to and spanning said side walls and said bezel frame to divert moisture from the device contained within the enclosure.

15. For use with a device having a front panel with controls thereon adapted to be installed on a substantially vertical surface, a water resistant enclosure for the front panel of such device comprising:
 a. a pair of side walls adapted to connect to the device and to the surface;
 b. a bezel frame attached to said side walls and adapted to attach to the surface;
 c. a window rotatable mounted on said side walls and fitted within said bezel frame, said window being adapted to isolate the front panel from exterior moisture;
 d. sealing gasket means attached between said window and said bezel frame and adapted to provide a water resistent seal between said window and said bezel frame when said window is in a closed configuration;
 e. biasing means coupled between said side walls and said window for biasing said window in an open configuration within said bezel frame; and
 f. latching means adapted to hold said window in the closed configuration within said bezel frame against the bias of said biasing means and said sealing gasket means, thereby maintaining a water resistant barrier between the device and the environment of the device;
whereby said window is held open affording access to operate the front panel controls of the device and whereby the front panel is protected from ambient moisture when said window is in the closed configuration.

* * * * *